US006706430B2

(12) United States Patent
Wheat et al.

(10) Patent No.: US 6,706,430 B2
(45) Date of Patent: Mar. 16, 2004

(54) ELECTRONIC BY-PASS OF FUEL CELL CATHODE GAS TO COMBUSTOR

(75) Inventors: William S. Wheat, Rochester, NY (US); Derek S. Kilmer, Rochester, NY (US); Bruce J. Clingerman, Palmyra, NY (US); Matthew K. Hortop, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 490 days.

(21) Appl. No.: 09/848,476

(22) Filed: May 3, 2001

(65) Prior Publication Data

US 2002/0164508 A1 Nov. 7, 2002

(51) Int. Cl.$^7$ ................................................ H01M 8/04
(52) U.S. Cl. ............................................ 429/13; 429/34
(58) Field of Search .............................. 429/13, 34, 14, 429/22, 37, 38

(56) References Cited

U.S. PATENT DOCUMENTS 5,935,725 A    8/1999    Dhar et al.
5,952,119 A    9/1999    Wilson
6,432,568 B1 * 8/2002    Salvador et al. .............. 429/19

* cited by examiner

*Primary Examiner*—Randy Gulakowski
*Assistant Examiner*—M. Wills
(74) *Attorney, Agent, or Firm*—Cary W. Brooks; Linda M. Deschere

(57) ABSTRACT

A gas flow control system for a fuel cell includes a gas supply and a humidifier. A fuel cell stack includes a cathode flow line with an inlet and an outlet. The inlet of the cathode flow line is connected to the outlet of the humidifier. A combustor includes an inlet that receives gas from the outlet of the cathode flow line. A valve and a bypass line bypass gas around the humidifier and the fuel cell stack to the combustor. The valve is preferably one of a gas restriction valve, a throttle valve, and a directional valve. A gas flow sensor generates a gas flow signal based on gas flowing through at least one of the humidifier, the cathode flow line of the fuel cell stack, and the bypass line. A flow controller that is connected to the gas flow sensor and the valve controls the valve based on the gas flow signal.

20 Claims, 4 Drawing Sheets

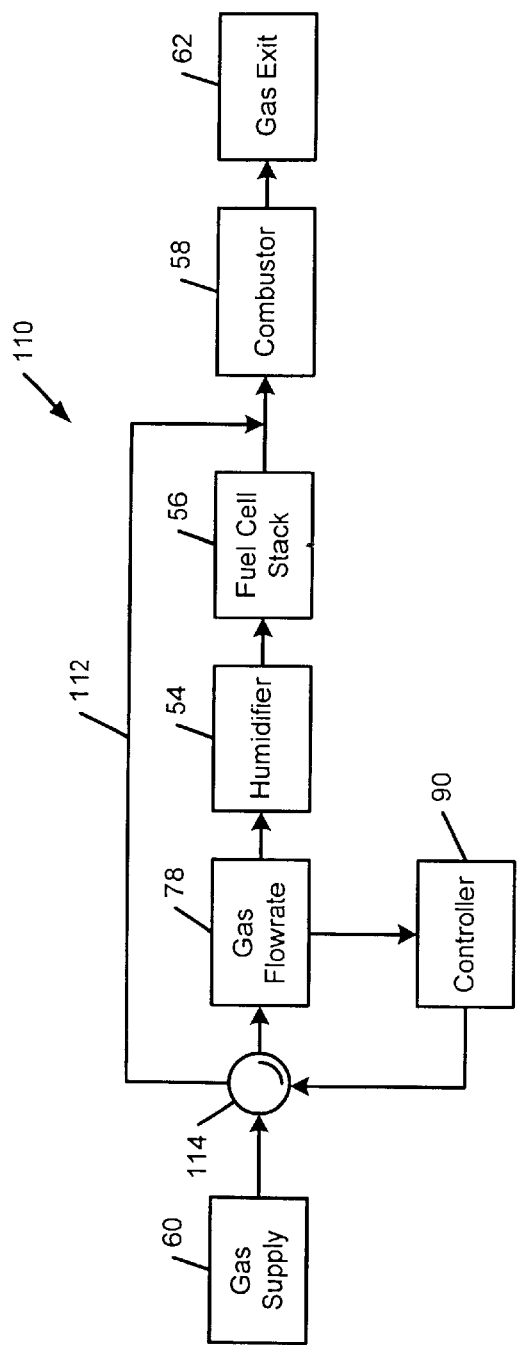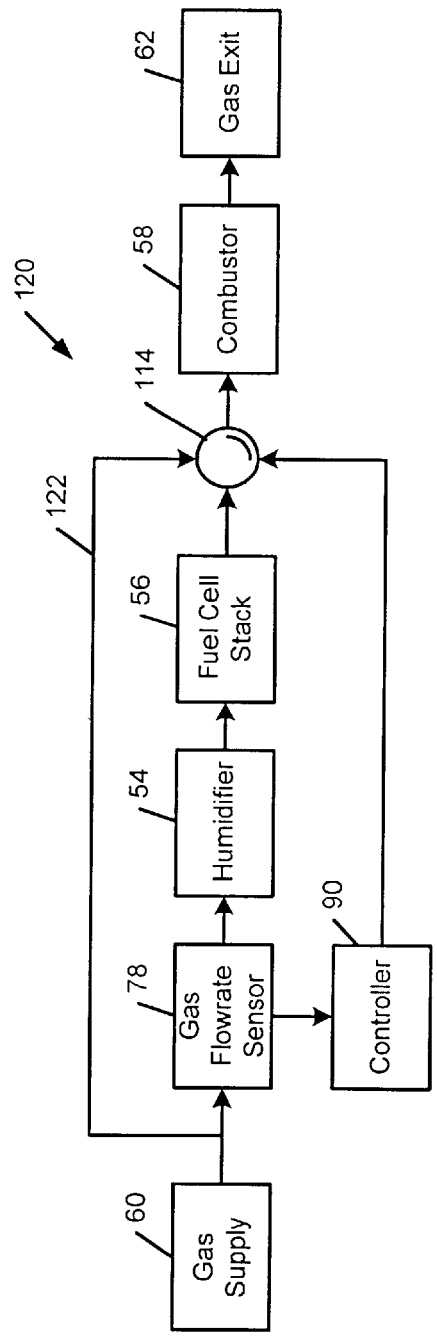

ELECTRONIC BY-PASS OF FUEL CELL CATHODE GAS TO COMBUSTOR

FIELD OF THE INVENTION

The present invention relates to a fuel cell and, more particularly, to a system and method for controlling gas flow to a fuel cell and a combustor.

BACKGROUND OF THE INVENTION

Fuel cells are increasingly being used as a power source in a wide variety of different applications. Fuel cells have also been proposed for use in vehicles as a replacement for internal combustion engines. A solid-polymer-electrolyte fuel cell includes a membrane that is sandwiched between an anode and a cathode. To produce electricity through an electrochemical reaction, hydrogen ($H_2$) is supplied to the anode and oxygen ($O_2$) is supplied to the cathode. In some systems, the source of hydrogen is reformate and the source of oxygen is air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through load that is connected across the membrane. In a second half-cell reaction, oxygen ($O_2$) at the cathode reacts with protons ($H^+$), and electrons ($e^-$) are taken up to form water ($H_2O$).

To operate efficiently and to produce a maximum amount of electricity, the fuel cell must be properly humidified. To achieve the proper humidity range, the hydrogen stream and/or the oxygen stream are typically humidified by one of several methods known in the art. Conventional humidity control methods generally fail to sufficiently control the humidity of the hydrogen and oxygen streams to the fuel cell. Providing too much humidity to the fuel cell blocks the reacting gases from accessing the catalyst thereby impeding the electrochemical reaction between the hydrogen and the oxygen and reducing the production of electricity. Providing too little humidity to the fuel cell restricts or limits the proton transportation required for reaction within the fuel cell and can also physically damage the fuel cell.

Fuel cells pass the oxygen stream through a cathode flow line of the fuel cell stack to provide oxygen for fuel cell operation. The hydrogen-rich fuel stream passes through an anode flow line of the fuel cell stack to provide hydrogen for the fuel cell operation. A combustor that is connected to an output of the anode flow line burns excess hydrogen passed by the fuel cell stack to provide heat for the fuel cell system. To control the temperature of the combustor, it is necessary to provide an oxygen stream to cool or heat the combustor. The combustor can be run rich or lean. If run rich, more oxygen increases the combustor's temperature. If run lean, more oxygen cools the combustor because the oxygen acts as a diluent. The oxygen stream is typically provided by the outlet of the cathode flow line of the fuel cell stack.

To operate the fuel cell stack efficiently, it is necessary to control the stoichiometry of the gas streams to the anode and the cathode flow lines. Because the fuel cell stack and the combustor are in series, the supplied oxygen flowrate is the maximum of either the required cathode stoichiometry or the required combustor air. Conventionally, the flowrate of the oxygen stream that is required to meet the cathode stoichiometry is considerably less than the oxygen stream that is required by the combustor. Oftentimes, the quality of the oxygen stream passing through the fuel cell stack is much higher than the optimum stoichiometry, which adversely impacts efficiency. There is also a pressure drop due to passing excess oxygen through the fuel cell stack. The pressure drop increases the load on the compressor, which also reduces overall system efficiency.

Additionally, the cathode flow line of the fuel cell stack requires a certain level of humidification for proper operation. On the other hand, the performance of the combustor is adversely impacted by the oxygen stream with high water content. When the combustor requires more air than the fuel cell stack, the fuel cell stack still requires all the air going through to be humidified to the same relative humidity level. The additional water and heat that is used to humidify the oxygen that is not needed by the cathode requires the use of a larger humidifier than would otherwise be required.

SUMMARY OF THE INVENTION

A gas flow control system for a fuel cell includes a gas supply and a humidifier. An inlet of the humidifier is connected to an outlet of the gas supply. A fuel cell includes a cathode flow line. An inlet of the cathode flow line is connected to an outlet of the humidifier. A combustor includes an inlet that receives gas from the outlet of the cathode flow line. A valve and a bypass line bypass gas around the humidifier and the fuel cell stack to the inlet of the combustor.

In other features of the invention, the valve is preferably a gas restriction valve, a throttle valve, or a directional valve. The valve is preferably located in the bypass line, between the gas supply and the humidifier, or between the fuel cell stack and the combustor.

In still other features of the invention, a gas flow sensor generates a gas flow signal based on gas flowing through at least one of the humidifier, the cathode flow line of the fuel cell stack, and the bypass line. A flow controller that is connected to the gas flow sensor and the valve controls the valve based on the gas flow signal.

Other objects, features, and advantages will be readily apparent from the specification, the claims and the drawings.

BRIEF DESCRIPTION OF THE DRAWINGS

The various features, advantages and other uses of the present invention will become apparent by referring to the following description and drawings in which:

FIG. 4A is a schematic block diagram illustrating a third gas flow control system for a fuel cell that includes a valve that is located between the gas supply and the humidifier;

FIG. 4B is a schematic block diagram illustrating a fourth gas flow control system for a fuel cell that includes a valve that is located between the fuel cell stack and the combustor.

DETAILED DESCRIPTION OF THE PREFERRED EMBODIMENTS

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

The gas flow control system of the present invention employs a bypass line and a valve to bypass gas around the humidifier and the fuel cell. The bypass line and the valve direct the gas that is bypassed to the combustor. Bypassing gas around the humidifier and the fuel cell reduces the humidity of the gas entering the combustor and reduces fuel cell system component requirements. The gas flow control system can operate on an individual fuel cell or a fuel cell stack. The gas that is bypassed is preferably air or oxygen that is flowing to the cathode flow line of the fuel cell. The gas flow control system may also be used to control the combustor temperature.

Figure 1:
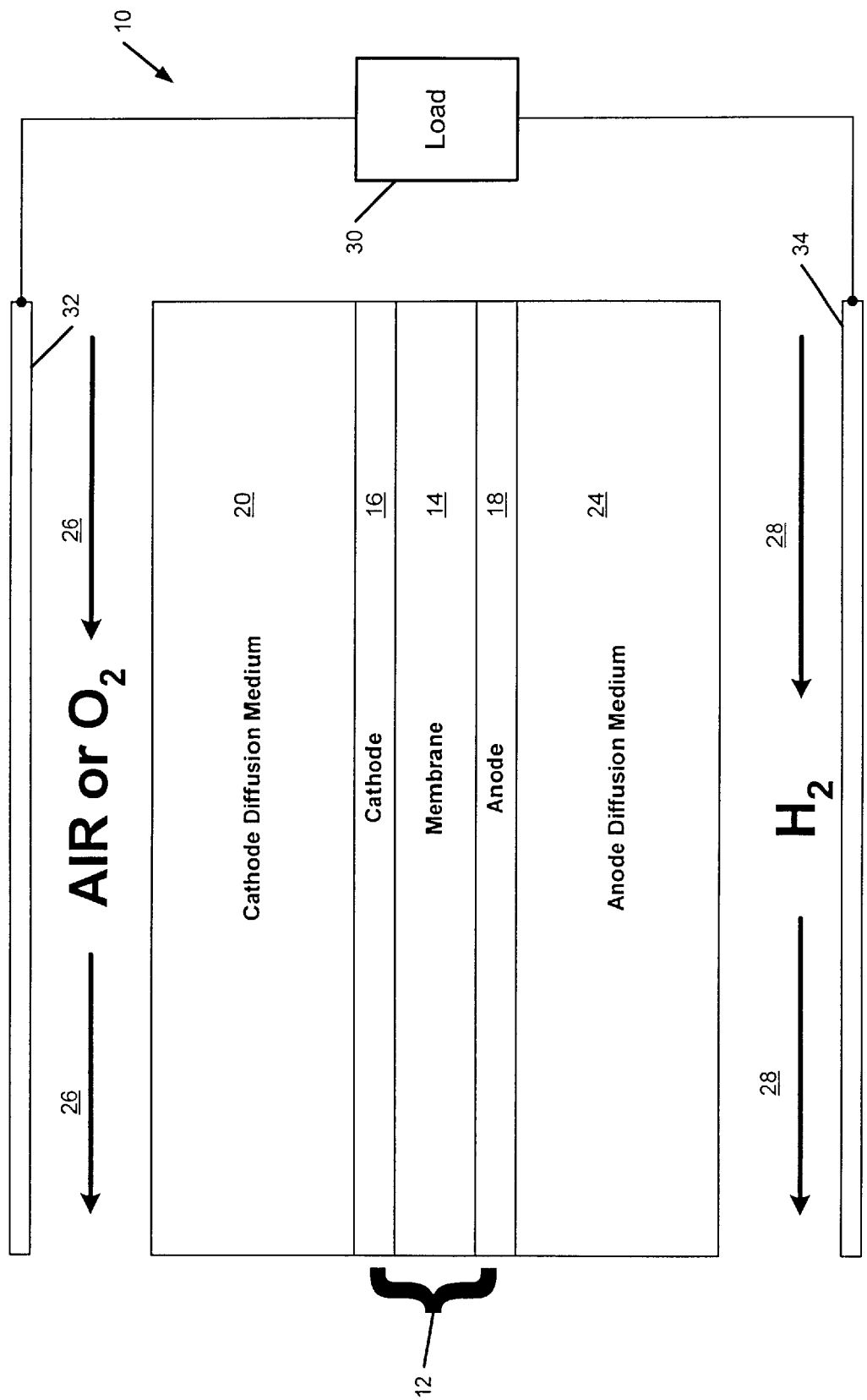
FIG. 1 illustrates a cross-section of a membrane electrode assembly of an exemplary fuel cell assembly.

Referring now to FIG. 1, a cross-section of a fuel cell assembly 10 that includes a membrane electrode assembly (MEA) 12 is shown. Preferably, the membrane electrode assembly is a proton exchange membrane (PEM). The membrane electrode assembly 12 includes a membrane 14, a cathode 16, and an anode 18. The member 14 is sandwiched between an inner surface of the cathode 16 and an inner surface of the anode 18.

A cathode diffusion medium 20 is located adjacent to the cathode 16. An anode diffusion medium 24 is located adjacent to an inner surface of the anode 18. The fuel cell assembly 10 further includes a cathode flow line 26 and an anode flow line 28. The cathode flow line 26 receives and directs oxygen ($O_2$) from a source to the cathode diffusion medium 20. The anode flow line 28 receives and directs hydrogen ($H_2$) from a source to the anode diffusion medium 24. For purposes of brevity, this description refers to hydrogen ($H_2$) and oxygen ($O_2$). Skilled artisans can appreciate the present invention can be applied in systems employing air and reformate.

In the fuel cell assembly 10, the membrane 14 is a cation permeable, proton conductive membrane having $H^+$ ions as the mobile ion. The fuel gas is hydrogen ($H_2$) and the oxidant is oxygen ($O_2$). The overall cell reaction is the oxidation of hydrogen to water and the respective reactions at the anode 18 and the cathode 16 are as follows:

$$H_2 = 2H^+ + 2e^-$$

$$0.5O_2 + 2H^+ + 2e^- = H_2O$$

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner. The cell reaction produces a proton exchange in a direction from the anode diffusion medium 24 towards the cathode diffusion medium 20. In this manner, the fuel cell assembly 10 produces electricity. A load 30 is electrically connected across the MEA 12 (in other words, the load is connected to plates 32 and 34. If the fuel cell has adjacent fuel cells, the plates 32 and/or 34 are bipolar. If there are no adjacent fuel cells, the plates 32 and/or 34 are end plates).

To operate efficiently and to produce the maximum amount of electricity, the fuel cell assembly 10 must be properly humidified. Typically, the oxygen stream supplied to the cathode flow line 26 and/or the hydrogen stream supplied to the anode flow line 28 are humidified by one of several ways known in the art. In a common approach, the anode gases and/or cathode gases are directed to a membrane humidifier before they are directed to the fuel cell. The humidifier may be either external to the fuel cell or it may comprise a section within the fuel cell stack. In another approach, the fuel cell can also be humidified via use of water wicking materials, as disclosed in U.S. Pat. Nos. 5,935,725 and 5,952,119, which are hereby incorporated by reference, that direct water from a reservoir to the MEA 12. Alternatively, a steam or a mist of water ($H_2O$) may be injected into both the cathode stream and the anode stream to humidify them upstream of or within the fuel cell stack. In yet another approach, an oxygen stream may be injected in the hydrogen stream upstream of the anode flow line 28 to react with a small amount of hydrogen to produce water that humidifies the hydrogen stream. A hydrogen stream may be injected into the oxygen stream upstream of the cathode to react with a small amount of oxygen to produce water that humidifies the oxygen stream.

Figure 2:
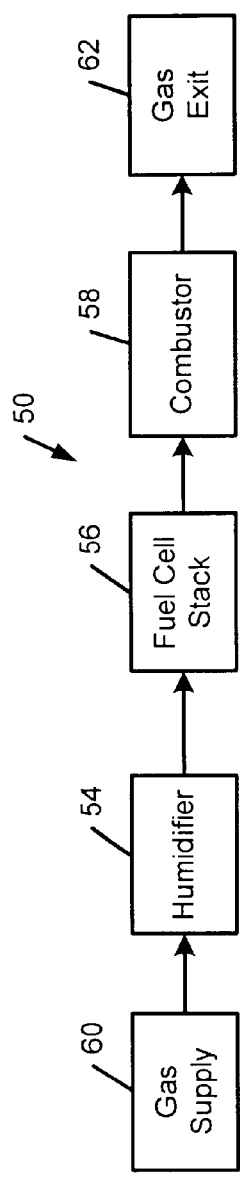
FIG. 2 is a schematic block diagram illustrating a gas flow control system for a fuel cell according to the prior art.

Referring now to FIG. 2, the gas flow control system 50 according to the prior art is illustrated and includes a humidifier 54, a fuel cell stack 56, and a combustor 58. The humidifier 54 increases the humidity of gas supplied by a gas supply 60. Gas, such as air or oxygen, is typically supplied to the gas supply 60 by a compressor (not shown). The humidifier 54 humidifies the gas provided to an inlet of the cathode flow line 26 of the fuel cell stack 56.

Fuel cells require an oxygen stream to pass through the cathode flow line 26 of the fuel cell stack 56 to provide oxygen for fuel cell operation. A hydrogen-rich fuel stream passes through the anode flow line 28 of the fuel cell stack 56 to provide hydrogen for fuel cell operation. An inlet of the combustor 58 is connected to an outlet of the anode flow line 28. The combustor 58 converts excess hydrogen and oxygen passed by the fuel cell stack 56 into water. This is an exothermic reaction and some of the heat that is generated goes back into the fuel cell system. To control the temperature of the combustor 58, it is necessary to provide the proper amount of oxygen to the combustor 58. The oxygen stream is typically provided by the oxygen stream exiting the cathode flow line 26 of the fuel cell stack 56.

To operate a fuel cell stack 56 at the optimal point, it is necessary to control the stoichiometry of the gas streams to the anode flow line 28 and the cathode flow line 26. Because the fuel cell stack 56 and the combustor 58 are in series, the supplied flowrate is the maximum of either the required cathode stoichiometry or the combustor oxygen stream that is required. The flowrate of the oxygen stream that is required to meet the cathode stoichiometry can be considerably less than the oxygen stream that is required by the combustor 58. The design in FIG. 2 is therefore not as efficient as possible. There is also an additional pressure drop due to excess air passing through the fuel cell stack 56. The pressure drop increases the load on the compressor (not shown), which reduces overall system efficiency.

Additionally, the cathode flow line 26 of the fuel cell stack 56 requires a certain level of humidification for proper operation. The combustor 58, on the other hand, does not necessarily require humidified air. The performance of the combustor 58 can be adversely impacted by the high water content of the oxygen stream entering the combustor 58. The additional water and heat that is used to humidify the oxygen that is not required by the cathode 16 leads to the use of a larger humidifier.

Figure 3A:
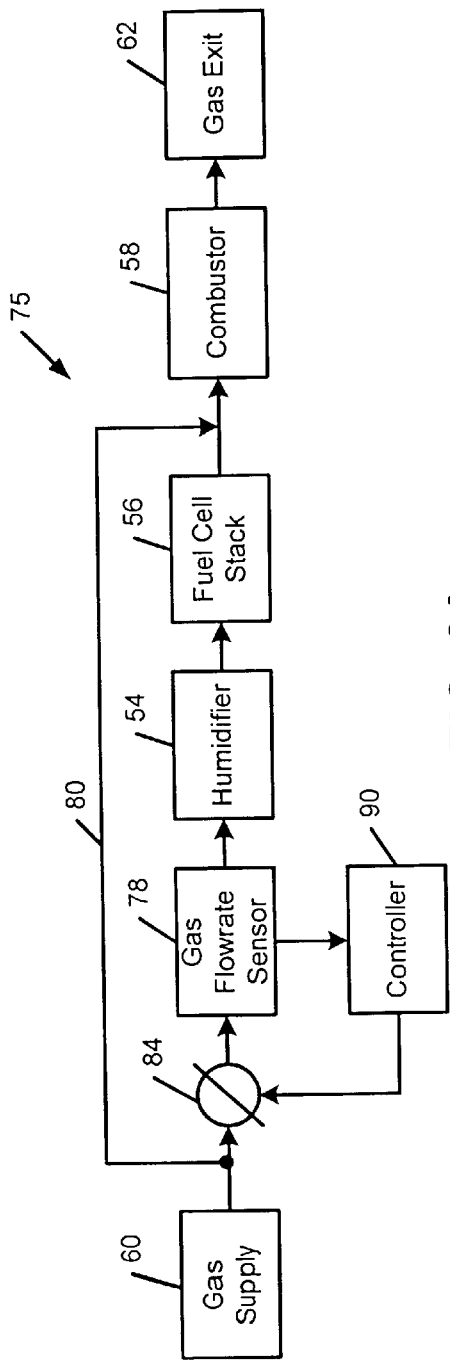
FIG. 3A is a schematic block diagram illustrating a first gas flow control system for a fuel cell that includes a valve that is located between the gas supply and the humidifier.

Referring now to FIG. 3A, reference numerals from FIG. 2 have been used where appropriate to identify similar elements. A gas flow control system 75 for a fuel cell according to the present invention includes a gas flowrate sensor 78 that measures the flowrate of the gas stream (such as air or oxygen) that is entering the humidifier 54. The gas flow rate sensor can be a virtual sensor modeled in software or any other suitable flowrate sensor. A gas bypass includes a valve 84 that is located between the gas supply and the inlet of the humidifier 54. A bypass line 80 has one end that is connected between the gas supply and the valve 84. An opposite end of the bypass line 80 is connected between the outlet of the fuel cell stack 56 and the inlet of the combustor 58. A flow controller 90 is connected to the gas flowrate sensor 78 and to the valve 84. The flow controller 90 can be an electronic circuit, an application specific integrated circuit (ASIC), a microprocessor and memory, or any other suitable control circuit.

The valve 84 is preferably a gas restriction valve or a throttle valve. Skilled artisans can appreciate that the gas flowrate sensor 78 can be located in other positions, such as in the bypass line 80. Typically the gas flowrate of the output of the compressor (e.g. the gas supply 60) is known. For example, a wire manometer is used to measure gas flowrate from the compressor and/or the rotational speed and pressure ratio of the compressor is used to derive the gas flowrate. While the gas flowrate sensor 78 can be located after the humidifier 54 or the fuel cell stack 56, this position is less desirable since water tends to collect on the wire manometer, which reduces accuracy. In a preferred embodiment, the valve 84 is similar to a conventional throttle valve that is employed in internal combustion engines.

In use, the gas flow control system 75 controls gas flowing through a first path including the humidifier 54 and the cathode flow line 26 of the fuel cell stack 56 and through a second path including the bypass line 80. The gas flow control system 75 reduces the system pressure drop by diverting a portion of the combustor gas through a second path around the humidifier 54 and the fuel cell stack 56. When the flow controller 90 determines that less oxygen is required by the cathode flow line 26, the flow controller 90 diverts more air to the second path and less air to the first path. When the flow controller 90 determines that more oxygen is required by the cathode flow line 26, the flow controller 90 diverts less air through the second path and move to the first path.

During certain system operational modes when the fuel cell stack 56 is not operating, the valve 84 is closed. All of the gas flows through the second path. When the fuel cell stack 56 is operational, the valve 84 and the controller 90 allow only the necessary flow of gas through the first path that is required to operate the cathode 16 at the proper stoichiometry. The rest of the gas flow is diverted through the second path. Because the excess gas flowing through the second path does not pass through the humidifier 54, the size of the humidifier can be reduced because thermal loading and water usage requirements depend solely on the stoichiometry requirements of the cathode 16 of the fuel cell stack 56.

At the outlet of the cathode flow line 26 of the fuel cell stack 56, the two gas streams are recombined to provide gas for the combustor 58. The valve 84 is preferably designed to fail in a closed position, which will force all of the gas to flow through the second path and prevent gas from entering the first path. This is the desired failsafe operational mode for the fuel cell system.

Figure 3B:
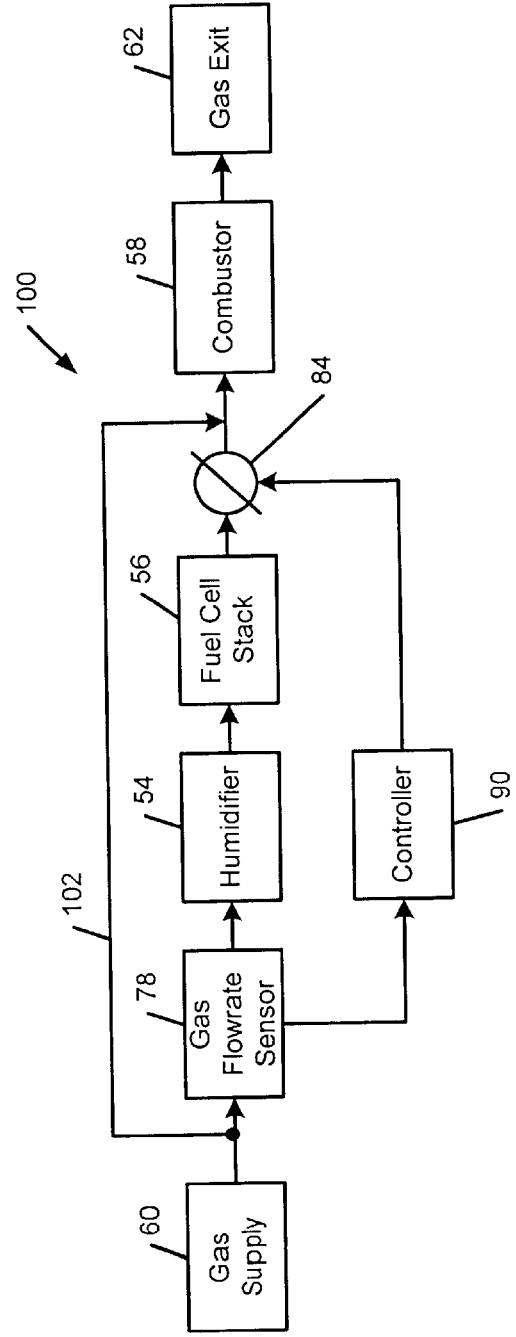
FIG. 3B is a schematic block diagram illustrating a second gas flow control system for a fuel cell that includes a valve that is located between the fuel cell stack and the combustor.

Referring now to FIG. 3B, reference numerals from FIGS. 2 and 3A have been used where appropriate to identify similar elements. A gas flow control system 100 for a fuel cell includes the gas flowrate sensor 78 that measures the flowrate of gas entering at the humidifier 54. A gas bypass includes a bypass line 102 having one end that is connected to the outlet of the valve 84. Skilled artisans can appreciate that the gas flowrate sensor 78 can be located in other positions as was described above. The valve 84 is connected between the outlet of the fuel cell stack 56 and the inlet of the combustor 58. One end of the bypass line 102 is connected between the gas supply 60 and the inlet of the humidifier 54. An opposite end of the bypass line 102 is connected between the valve 84 and the inlet of the combustor 58. The flow controller 90 is connected to the gas flowrate sensor 78 and to the valve 84. In a highly preferred embodiment, the valve 84 is similar to a conventional throttle valve that is employed in internal combustion engines. Operation of the gas flow control system 100 is similar to that described above with respect to FIG. 3A.

Referring now to FIG. 4A, reference numerals from FIGS. 2 and 3A have been used where appropriate to identify similar elements. A gas flow control system 110 includes the gas flowrate sensor 78 that measures the flowrate of gas entering at the humidifier 54. A gas bypass includes a bypass line 112 having one end that is connected to a valve 114. The valve 114 is preferably a directional valve. Skilled artisans can appreciate that the gas flowrate sensor 78 can be located in other positions as was previously described above. The valve 114 is connected between the gas supply 60 and the inlet of the humidifier 54. One end of the bypass line 112 is connected to the valve 114. An opposite end of the bypass line 112 is connected between the outlet of the fuel cell stack 56 and the inlet of the combustor 58. The flow controller 90 is connected to the gas flowrate sensor 78 and to the valve 114. Operation of the gas flow control system 110 is similar to that described above with respect to FIGS. 3A and 3B.

Referring now to FIG. 4B, reference numerals from FIGS. 2 and 4A have been used where appropriate to identify similar elements. A gas flow control system 120 for a fuel cell includes the gas flowrate sensor 78 that measures the flowrate of gas entering the humidifier 54. A gas bypass includes a bypass line 122 having one end that is connected to the valve 114. Skilled artisans can appreciate that the gas flowrate sensor 78 can be located in other positions as was previously described above. The valve 114 is connected between the fuel cell stack 56 and the inlet of the combustor 58. One end of the bypass line 122 is connected between the gas supply 60 and the inlet of the humidifier 54 . An opposite end of the bypass line 122 is connected to the valve 114. The flow controller 90 is connected to the gas flowrate sensor 78 and to the valve 114. Operation of the gas flow control system 110 is similar to that described above with respect to FIGS. 3A, 3B, and 4A.

Skilled artisans can appreciate that the diameter of the bypass lines 80, 102, 112 and 122 should be sized appropriately to avoid a short circuit condition in which all air flows around the fuel cell stack. The bypass lines 80, 102, 112, and 122 must be small enough or have a restriction so that flow is split between the paths. The bypass line diameter and/or the restriction should be sized to provide good flow resolution based on the movement of the valves.

Figure 5:
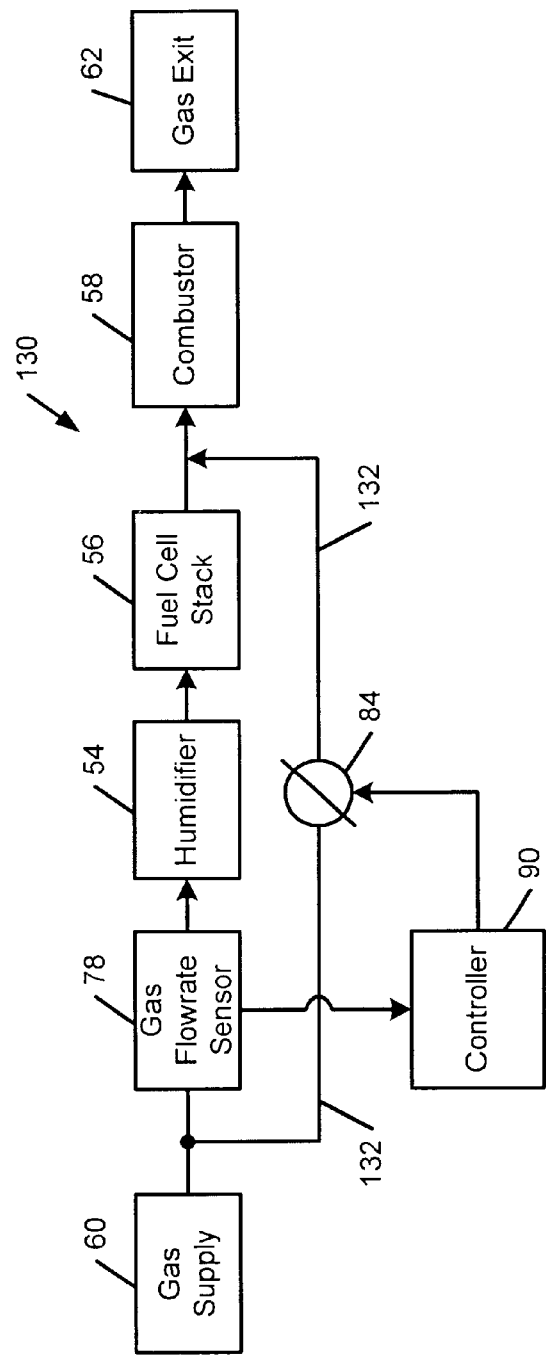
FIG. 5 is a schematic block diagram illustrating a fifth gas flow control system for a fuel cell that includes a valve in a bypass line.

Referring now to FIG. 5, reference numerals from FIGS. 2 and 3A have been used where appropriate to identify similar elements. A gas flow control system 130 according to the present invention includes the gas flowrate sensor 78 that measures the flowrate of gas entering the humidifier 54. A gas bypass includes a bypass line 132 having one end that is connected between the gas supply 60 and the inlet of the humidifier 54. The valve 84 is located in the bypass line 132. Skilled artisans can appreciate that the gas flowrate sensor 78 can be located in other positions as was described above. An opposite end of the bypass line 132 is connected between the outlet of the fuel cell stack 56 and the inlet of the combustor 58. The flow controller 90 is connected to the gas flowrate sensor 78 and to the valve 84.

The gas flow control system for a fuel cell according to the present invention provides control over the flow of gas to the fuel cell and to the combustor. Variable control of the stoichiometry of the cathode flow line maximizes fuel cell efficiency. The gas flow control systems allow a smaller humidifier to be used and reduce thermal load and water usage requirements of the fuel cell system. The gas flow control system has lower system pressure drops due to the diversion of a portion of gas around the fuel cell. The gas flow control system provides for failsafe operation of the combustor by allowing all available cooling air to be directed to the combustor in the event of an emergency shutdown. Without fuel, the combustor cools. The fuel cell system according to the invention is less expensive, smaller and lighter due to the gas flow control system set forth herein.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

What is claimed is:

1. A gas flow control system for a fuel cell, comprising:
   a gas supply;
   a humidifier including an inlet connected to said gas supply and an outlet;
   a fuel cell stack including a cathode flow line having an inlet and an outlet, wherein said inlet of said cathode flow line is connected to said outlet of said humidifier; and
   a combustor that includes an inlet that receives gas from said outlet of said cathode flow line;
   a bypass line having one end connected between said gas supply and said inlet of said humidifier and an opposite end connected between said outlet of said cathode flow line and said inlet of said combustor; and
   a valve located in said bypass line.

2. The gas flow control system of claim 1 wherein said valve is one of a gas restriction valve and a throttle valve.

3. The gas flow control system of claim 1 wherein said valve controls the amount of gas flowing from said gas supply through said humidifier to said fuel cell stack and through said bypass line to said combustor.

4. The gas flow control system of claim 1 further comprising:
   a gas flow sensor for generating a gas flow signal based on gas flow through at least one of said humidifier, said cathode flow line of said fuel cell stack, and said bypass line; and
   a flow controller connected to said gas flow sensor and said valve for controlling said valve based on said gas flow signal.

5. A gas flow control system for a fuel cell, comprising:
   a gas supply;
   a humidifier including an inlet connected to said gas supply and an outlet;
   a fuel cell stack including a cathode flow line having an inlet and an outlet, wherein said inlet of said cathode flow line is connected to said outlet of said humidifier; and
   a combustor that includes an inlet that is connected to said outlet of said cathode flow line;
   a valve located between said gas supply and said inlet of said humidifier; and
   a bypass line having one end connected between said gas supply and said valve and an opposite end connected between said outlet of said cathode flow line and said inlet of said combustor.

6. The gas flow control system of claim 5 wherein said valve is one of a gas restriction valve and a throttle valve.

7. The gas flow control system of claim 5 wherein said valve controls the amount of gas flowing from said gas supply through said humidifier to said fuel cell stack and through said bypass line to said combustor.

8. The gas flow control system of claim 5 further comprising:
   a gas flow sensor for generating a gas flow signal based on gas flowrate through at least one of said humidifier, said cathode of flow line said fuel cell stack, and said bypass line; and
   a flow controller connected to said gas flow sensor and said valve for controlling said valve based on said gas flow signal.

9. A gas flow control system for a fuel cell, comprising:
   a gas supply;
   a humidifier including an inlet connected to said gas supply and an outlet;
   a fuel cell stack including a cathode flow line having an inlet and an outlet, wherein said inlet of said cathode flow line is connected to said outlet of said humidifier;
   a combustor that includes an inlet that is connected to said outlet of said cathode flow line;
   a valve located between said outlet of said cathode flow line and said inlet of said combustor; and
   a bypass line having one end connected between said gas supply and said inlet of said humidifier and an opposite end connected between said valve and said inlet of said combustor.

10. The gas flow control system of claim 9 wherein said valve is one of a gas restriction valve and a throttle valve.

11. The gas flow control system of claim 9 wherein said valve controls the amount of gas flowing from said gas supply through said humidifier to said fuel cell stack and through said bypass line to said combustor.

12. The gas flow control system of claim 9 further comprising:
   a gas flow sensor for generating a gas flow signal based on gas flow through at least one of said humidifier, said cathode flow line of said fuel cell stack, and said bypass line; and
   a flow controller connected to said gas flow sensor and said valve for controlling said valve based on said gas flow signal.

13. A gas flow control system for a fuel cell, comprising:

a gas supply;

a humidifier including an inlet connected to said gas supply and an outlet;

a fuel cell stack including a cathode flow line having an inlet and an outlet, wherein said inlet of said cathode flow line is connected to said outlet of said humidifier; and a combustor that includes an inlet that is connected to said outlet of said cathode flow line;

a valve located between said gas supply and said inlet of said humidifier; and a bypass line having one end connected to said valve and an opposite end connected between said outlet of said cathode flow line and said inlet of said combustor.

14. The gas flow control system of claim 13 wherein said valve is a directional valve.

15. The gas flow control system of claim 13 wherein said valve controls the amount of gas flowing from said gas supply through said humidifier to said fuel cell stack and through said bypass line to said combustor.

16. The gas flow control system of claim 13 further comprising:

a gas flow sensor for generating a gas flow signal based on gas flow through at least one of said humidifier, said cathode flow line of said fuel cell stack, and said bypass line; and a flow controller connected to said gas flow sensor and said valve for controlling said valve based on said gas flow signal.

17. A gas flow control system for a fuel cell, comprising:

a gas supply;

a humidifier including an inlet connected to said gas supply and an outlet;

a fuel cell stack including a cathode flow line having an inlet and an outlet, wherein said inlet of said cathode flow line is connected to said outlet of said humidifier; and a combustor that includes an inlet that is connected to said outlet of said cathode flow line;

a valve located between said outlet of said fuel cell stack and said inlet of said combustor; and a bypass line having one end connected between said gas supply and said inlet of said humidifier and an opposite end connected to said valve.

18. The gas flow control system of claim 17 wherein said valve is a directional valve.

19. The gas flow control system of claim 17 wherein said valve controls the amount of gas flowing from said gas supply through said humidifier to said fuel cell stack and through said bypass line to said combustor.

20. The gas flow control system of claim 17 further comprising:

a gas flow sensor for generating a gas flow signal based on gas flow through at least one of said humidifier, said cathode flow line of said fuel cell stack, and said bypass line; and a flow controller connected to said gas flow sensor and said valve for controlling said valve based on said gas flow signal.

* * * * *